(12) United States Patent
Blume

(10) Patent No.: US 9,156,487 B1
(45) Date of Patent: Oct. 13, 2015

(54) KNEELING WHEELBARROW

(71) Applicant: Christopher Edward Blume, Hurst, TX (US)

(72) Inventor: Christopher Edward Blume, Hurst, TX (US)

( * ) Notice: Subject to any disclaimer, the term of this patent is extended or adjusted under 35 U.S.C. 154(b) by 0 days.

(21) Appl. No.: 14/658,173

(22) Filed: Mar. 14, 2015

Related U.S. Application Data

(60) Provisional application No. 61/997,200, filed on May 27, 2014.

(51) Int. Cl.
*B62B 1/18* (2006.01)
*B62B 1/20* (2006.01)
*B60P 1/28* (2006.01)

(52) U.S. Cl.
CPC *B62B 1/208* (2013.01); *B60P 1/283* (2013.01)

(58) Field of Classification Search
CPC ............ B62B 1/18; B62B 1/20; B62B 1/202; B62B 1/204; B62B 1/206; B62B 1/208; B62B 1/24; B60P 1/283
See application file for complete search history.

(56) References Cited

U.S. PATENT DOCUMENTS

| | | | | |
|---|---|---|---|---|
| 1,032,009 A * | 7/1912 | Long | ................................ | 298/3 |
| 1,103,759 A * | 7/1914 | Gnatzig | ............................ | 298/3 |
| 1,261,532 A * | 4/1918 | Hoe | ................................. | 298/3 |
| 1,327,578 A * | 1/1920 | Vessey | ............................ | 37/434 |
| 1,544,769 A * | 7/1925 | Nalder | .............................. | 298/3 |
| 1,804,403 A * | 5/1931 | Dowling | ......................... | 37/434 |
| 1,804,404 A * | 5/1931 | Dowling | ......................... | 37/434 |
| 1,817,934 A * | 8/1931 | Sahler | ............................... | 298/3 |
| 2,037,222 A * | 4/1936 | Farrar | ................................ | 298/3 |
| 2,475,278 A * | 7/1949 | Coakley | ..................... | 280/47.26 |
| 2,544,505 A * | 3/1951 | Kronhaus | ..................... | 414/554 |
| 2,965,910 A * | 12/1960 | Van Ranst | ...................... | 15/79.1 |
| 3,021,625 A * | 2/1962 | Stasse | .............................. | 37/434 |
| 3,160,439 A * | 12/1964 | Kazakowitz | ...................... | 298/2 |
| 3,178,228 A * | 4/1965 | Gibson et al. | ...................... | 298/2 |
| 3,323,837 A * | 6/1967 | Landry | ............................... | 298/2 |
| 4,341,393 A * | 7/1982 | Gordon et al. | ............. | 280/47.26 |
| 4,471,996 A * | 9/1984 | Primeau | ............................ | 298/3 |
| 4,811,988 A * | 3/1989 | Immel | ................................ | 298/2 |
| 4,921,305 A * | 5/1990 | Steer | ................................. | 298/3 |
| 5,048,206 A * | 9/1991 | Jones | ............................... | 37/265 |
| 5,372,376 A * | 12/1994 | Pharaoh | ........................ | 280/653 |
| 6,193,319 B1 * | 2/2001 | Kielinski | ........................... | 298/2 |
| 6,886,838 B1 * | 5/2005 | Zimmerman | .............. | 280/47.31 |
| 7,296,807 B2 * | 11/2007 | Zimmerman | .............. | 280/47.32 |
| 7,547,026 B2 * | 6/2009 | Morris | ....................... | 280/47.31 |
| 7,775,531 B2 * | 8/2010 | Zimmerman | .............. | 280/47.31 |
| 7,937,859 B2 * | 5/2011 | Downes | .......................... | 37/434 |
| 8,544,874 B2 * | 10/2013 | Cooper | ......................... | 280/659 |
| 8,668,210 B2 * | 3/2014 | Stevens | ...................... | 280/47.26 |
| 2002/0113388 A1 * | 8/2002 | Robinson | ................... | 280/47.31 |
| 2002/0113389 A1 * | 8/2002 | Robinson | ................... | 280/47.31 |
| 2002/0195783 A1 * | 12/2002 | Robinson | ................... | 280/47.31 |
| 2006/0033311 A1 * | 2/2006 | Lim | .................................. | 280/653 |
| 2008/0067767 A1 * | 3/2008 | Zimmerman | .............. | 280/47.31 |
| 2008/0084038 A1 * | 4/2008 | Byers | ......................... | 280/47.34 |
| 2008/0265537 A1 * | 10/2008 | Lin | ............................. | 280/47.31 |
| 2011/0272924 A1 * | 11/2011 | Kilen | ........................... | 280/653 |
| 2013/0062844 A1 * | 3/2013 | Stevens | ...................... | 280/47.26 |
| 2013/0146630 A1 * | 6/2013 | Cooper | ......................... | 224/401 |
| 2014/0159464 A1 * | 6/2014 | Jarvis | ................................ | 298/2 |

\* cited by examiner

*Primary Examiner* — Hau Phan
*Assistant Examiner* — Jacob Meyer

(57) ABSTRACT

A wheelbarrow that can transition from a conventional wheelbarrow configuration to a loading platform that places a wall of the carrier flat on the ground to facilitate placing an object or objects on it without requiring lifting, and then transition back to conventional Wheelbarrow configuration using mechanical advantage.

1 Claim, 3 Drawing Sheets

Transport position

Load unload position

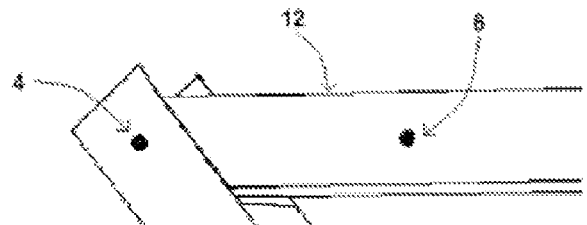
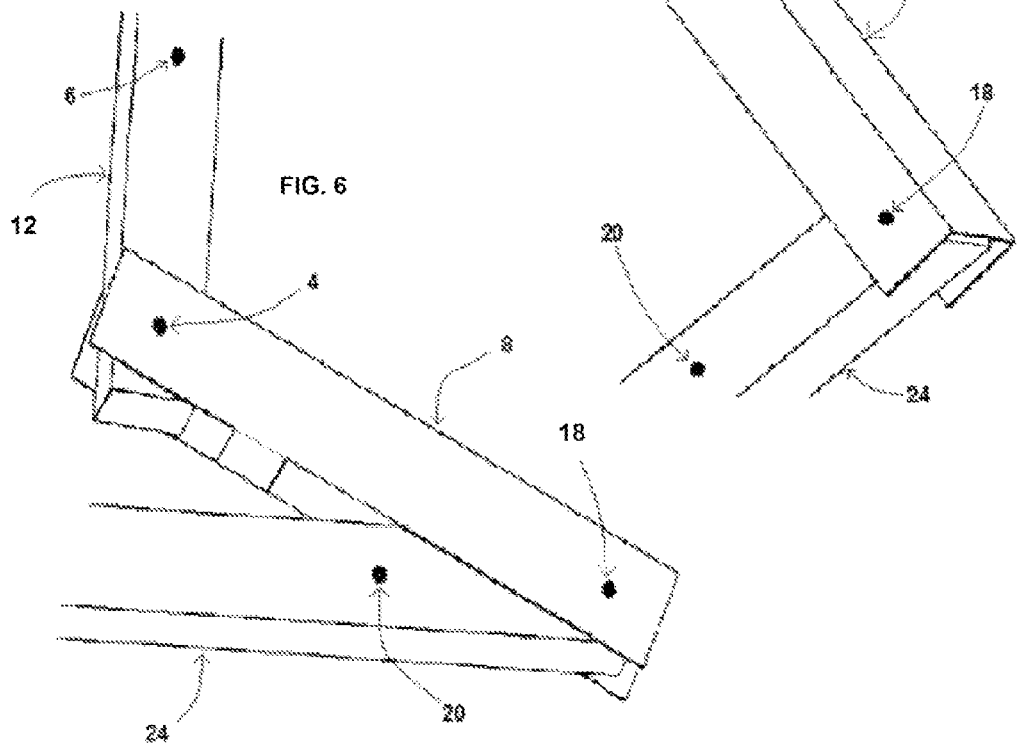
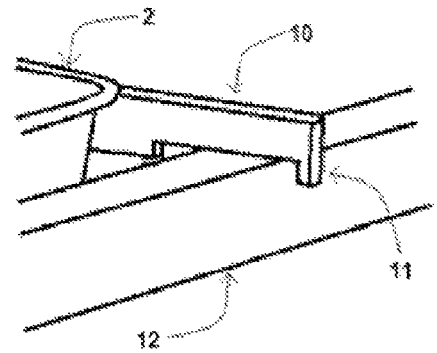

KNEELING WHEELBARROW

BACKGROUND OF THE INVENTION

This invention applies to manual load lifting and transporting devices commonly referred to as wheelbarrows. It is the Inventors intention to improve the existing design so as to ease loading and unloading through mechanical advantage and positioning of the carrier.

A conventional prior art wheelbarrow (fixed handles, wheel and carrier) requires a user to lift the load above the carrier walls to place it in the carrier for transport. To dump the load, a prior art wheelbarrow requires a considerable force to lift the load via the handles over and around a fixed wheel. This lifting of the load to fill and empty the wheelbarrow can be difficult due to weight of the object to be transported. Another drawback is that when dumping, the load can shift and cause it to be dumped in the wrong direction; or if you wish to dump part of the load in one area and more in another, it is very difficult to dump in measured amounts while holding the handles up high, and also because of the carrier obstructs your view of the dump zone.

SUMMARY OF THE INVENTION

The Kneeling Wheelbarrow actuation allows the user to place the forward wall of the carrier flat on the ground providing a platform so one can drag, roll, or place large heavy objects on or off of it, or one may use a tool such as a garden rake to drag piles of dirt onto or off of the platform thus alleviating the need to physically lift the load above the carrier wall to place into or remove from the carrier. The mechanical advantage of the lever handles allows lifting heavier loads using less physical force. To load the carrier, place the handles in the load unload position, this places the forward wall flat on the ground, then place the object to be transported on the forward wall then pull back on the lever handles and place them in the transport position, then pick up and walk as a prior art wheel barrow.

To remove the load from the carrier one moves the handles from the transport position to the load unload position and the carrier makes a controlled gravity assisted transition that places the forward wall of the carrier flat on the ground and thus allow discharge of all or part of the load. The load may also be dumped the same as a prior art wheelbarrow.

BRIEF DESCRIPTION OF THE DRAWINGS

FIG. 5 Left side perspective zoomed on the floating link in the transport position from slightly below and behind.
FIG. 6 Left side perspective zoomed on the floating link in the load unload position from slightly below and forward.
FIG. 7 Upstop left side zoom view in the transport position from slightly above and forward.

DETAILED DESCRIPTION OF THE INVENTION

Figure 1:
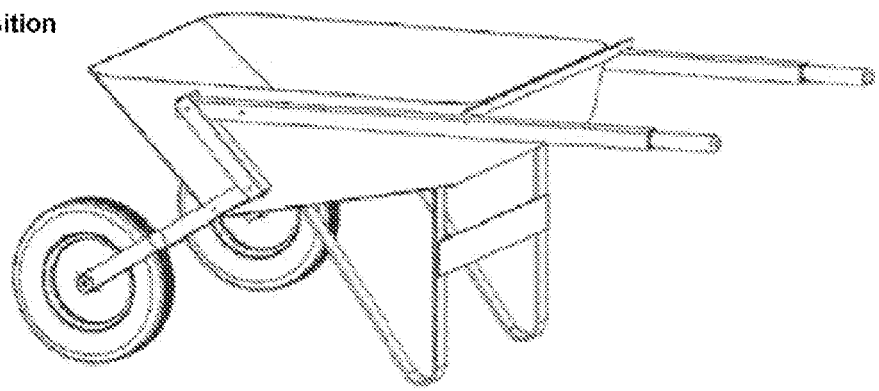
FIG. 1 Left rear perspective view in the transport position of the preferred embodiment.

A wheelbarrow incorporating at least one lever handle (12), that rotates on the handle fixed pivot pin (6), a floating link (8) attached at one end of the lever handle (12) in a manner to allow rotation in the same plane as the lever handle (12), a wheel strut (24) that is connected at one end to the floating link (8) opposite of the lever handle (12). The wheel strut (24) also rotates about the strut fixed pivot pin (20) in the same plane as the lever handle (12).

In the preferred configuration the lever handle, floating link, and the wheel strut attachment is as described herein and illustrated in the views, with the wheel strut rotating in the opposite direction from the lever handle. The preferred material for manufacture is steel, although other materials such as wood may be contemplated. Two assemblies as described above attached to each side of the wheelbarrow provide optimum performance. The location of the attaching pieces can be altered to produce different rotation directions and arc lengths.

Figure 2:
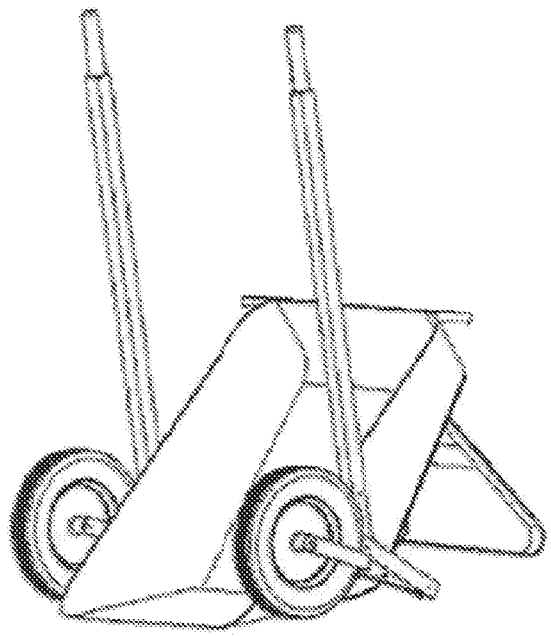
FIG. 2 Left front perspective view of the load unload position.

The moveable lever handle (12) replaces the fixed handle of a prior art wheelbarrow. It consists of a grip (14) located at one end and is used to grasp and rotate the lever handle (12) to reconfigure the kneeling wheelbarrow between transport (FIG. 1) and load unload position (FIG. 2). The lever handle (12) rotates about the handle fixed pivot pin (6) that is affixed to the carrier (2).

The floating link (8) is the interconnect between the lever handle (12) and the wheel strut (24) via the upper floating pivot pin (4) and the lower floating pivot pin (18). There is no equivalent part on a prior art wheelbarrow. The floating link (8) is constructed to provide travel limits of both the lever handle (12) and the wheel strut (24). The floating link (8) provides a travel limit to the lever handle (12) in the clockwise direction (ref FIG. 3) of the grip (14) after the lever handle (12) moves downward enough to clear the upstops outer tip (11) (ref. FIG. 7).

Figure 3:
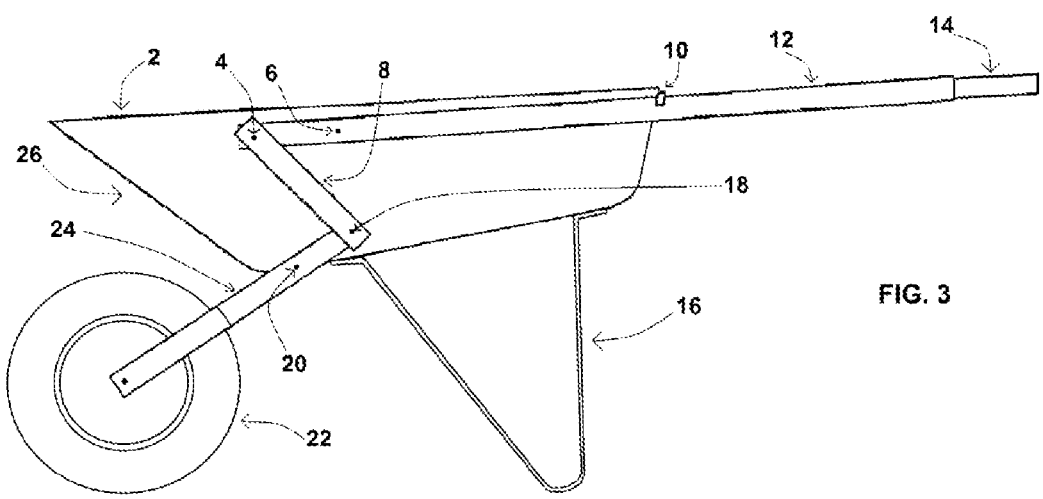
FIG. 3 Left side elevation of the transport position.

Said travel limit is accomplished by the amount of gap between the lever handle (12) lower surface and the floating link (8) aft surface cutout, where the lever handle (12) feeds into and attaches to the floating link (8) via upper floating pivot pin (4) (ref FIG. 5). The floating link (8) also provides a travel limit of the wheel strut (24) rotating in the counterclockwise direction, (ref. FIG. 3), by the wheel strut (24) aft edge contact with the floating link (8) aft edge at the lower floating pivot pin (18) area (ref FIG. 5). The floating links (8) travel limit of the wheel strut (24) in the upward direction is accomplished by the wheel strut (24) forward surface contacting the forward surface of the floating link (8) in the area of the upper floating pivot pin (4), (ref FIG. 6)

The wheel strut (24) pivots around the strut fixed pivot pin (20) that is attached to the carrier (2). There is no equivalent part on a prior art wheelbarrow, which typically has the wheel attached to the handle and is non moveable. One end of the wheel strut (24) is connected to the floating link (8) via the lower floating pivot pin (18). On the opposite end the wheel (22) is rotationally attached.

Figure 4:
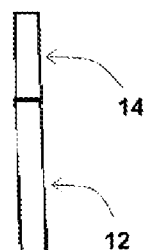
FIG. 4 Left side elevation of the load unload position.
Figure 4:
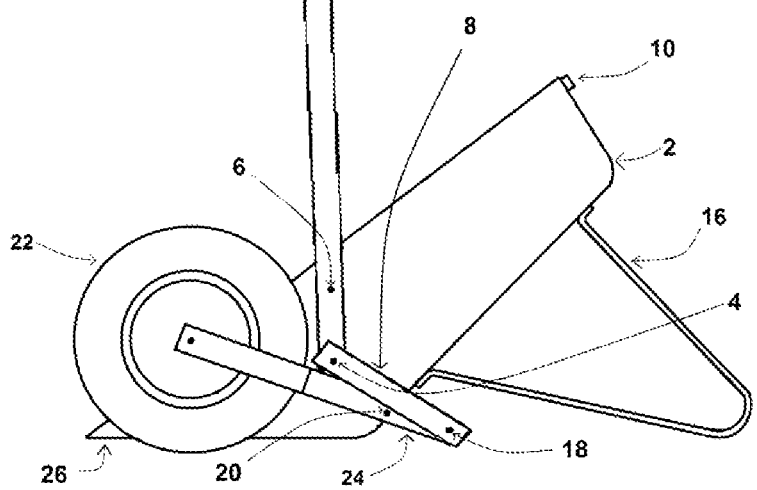

The handle upstop (10) provides a positive stop of the lever handle (12) that prevents it from rotating upward from the transport position (FIG. 3) toward the load unload position (FIG. 4) thus making possible the ability to pick up on the grip (14) and walk with the load just as a prior art wheelbarrow. To defeat the handle upstop (10) and move the lever handle (12) from transport position (FIG. 3), toward the load unload position (FIG. 4), the first action is to move the grip (14) downward or clockwise (ref FIG. 3) enough to allow the lever handle (12) to clear the handle upstops outer tip (11) (ref FIG. 7), then outward, away from the carrier (2) and around the handle upstops outer tip (11), enough to allow moving the lever handle (12) upward toward the load unload position (FIG. 4).

This operation is reversed when reconfiguring from the load unload (FIG. 4) position to the transport position (FIG. 3)

to re-engage the upstop for transport. There is no equivalent part on a prior art wheelbarrow.

Reference the transport position (FIG. 3). By grasping the grip (14) and moving the lever handle (12) as described above to defeat the upstop and counterclockwise from the transport position (FIG. 3), to the load unload position (FIG. 4), causes the floating link (8) to translate the wheel strut (24) clockwise about the strut fixed pivot pin (20), which in turn allows the carrier (2) to rotate downward about the rest (16) until the carrier (2) forward wall (26) contacts the ground.

Reference the load unload position (FIG. 4). By grasping the grip (14) and moving the lever handle (12) clockwise from the load unload position, to the transport position (FIG. 3), causes the floating link (8) to translate the wheel strut (24) counterclockwise about the strut fixed pivot pin (20) and forces the carrier (2) to rotate up about its rest (16) returning the carrier (2) to the transport position (FIG. 3). Then re-engage the upstop as described above.

The invention claimed is:

1. A wheelbarrow comprising: a carrier having a base, a forward wall, an aft wall, a first sidewall, and a second sidewall; a rest comprised of two legs transversely supported and affixed to the bottom of said carrier base toward said aft wall; a handle with a grip at one end, said handle pivotally mounted to said first sidewall between said grip and an opposite end; a floating link pivotally attached on one end to the end of said handle opposite of said grip; a wheel strut with a pivotally attached wheel at one end, said wheel strut pivotally attached to said first sidewall between said wheel and an opposite end; said wheel strut pivotally attached at said opposite end from said wheel to said floating link at an end opposite from said handle; wherein said handle, floating link, and wheel strut alignment allows said handle to induce opposite rotation of said wheel strut; further comprising a similar handle, floating link, and wheel strut assembly being mounted to said second sidewall; an upstop mounted across said aft wall providing means of preventing rotation of said handle assemblies about respective handle pivots; and wherein, to defeat said upstop and allow said handle to rotate, the handle is configured to be moved downward to clear the upstop, outward away from the carrier, and around the upstop.

* * * * *